No. 876,802.
PATENTED JAN. 14, 1908.
J. HETTRICH.
CORN HUSKING MACHINE.
APPLICATION FILED APR. 27, 1907.
2 SHEETS—SHEET 1.
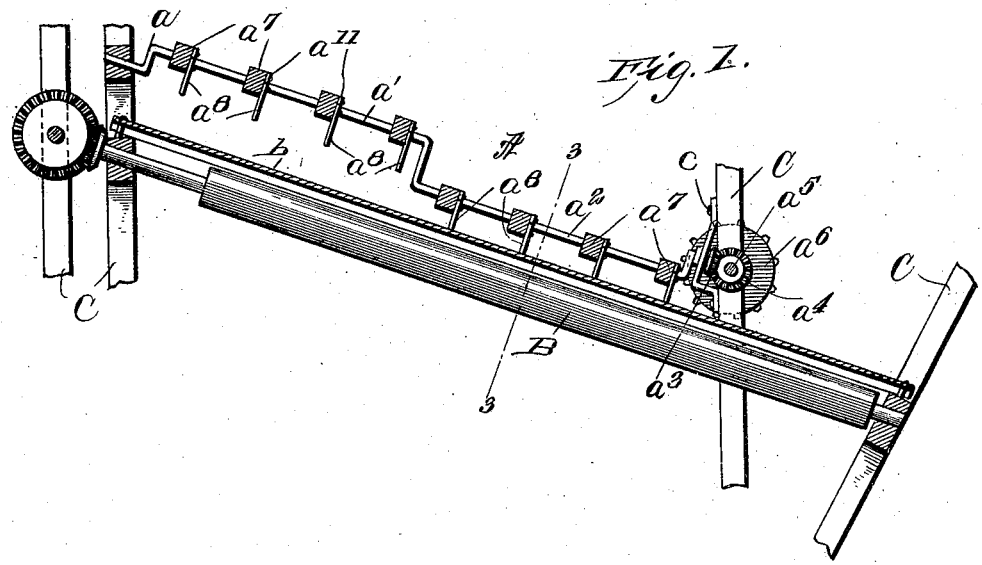
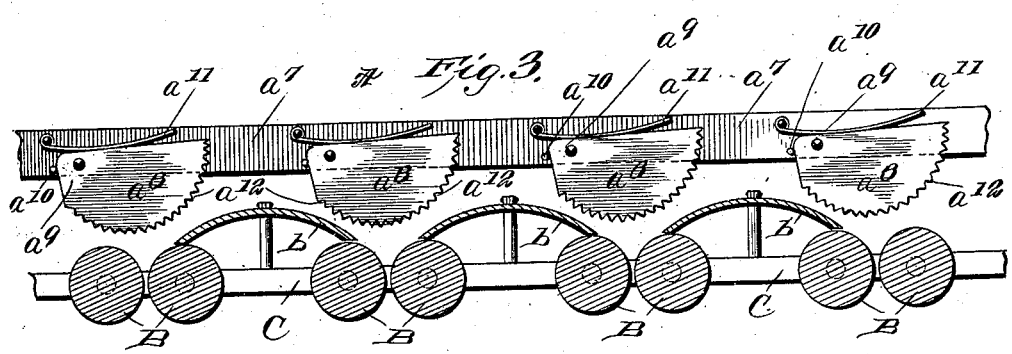
WITNESSES
INVENTOR
JOHN HETTRICH
BY
ATTORNEYS No. 876,802. PATENTED JAN. 14, 1908.
J. HETTRICH.
CORN HUSKING MACHINE.
APPLICATION FILED APR. 27, 1907.
2 SHEETS—SHEET 2.
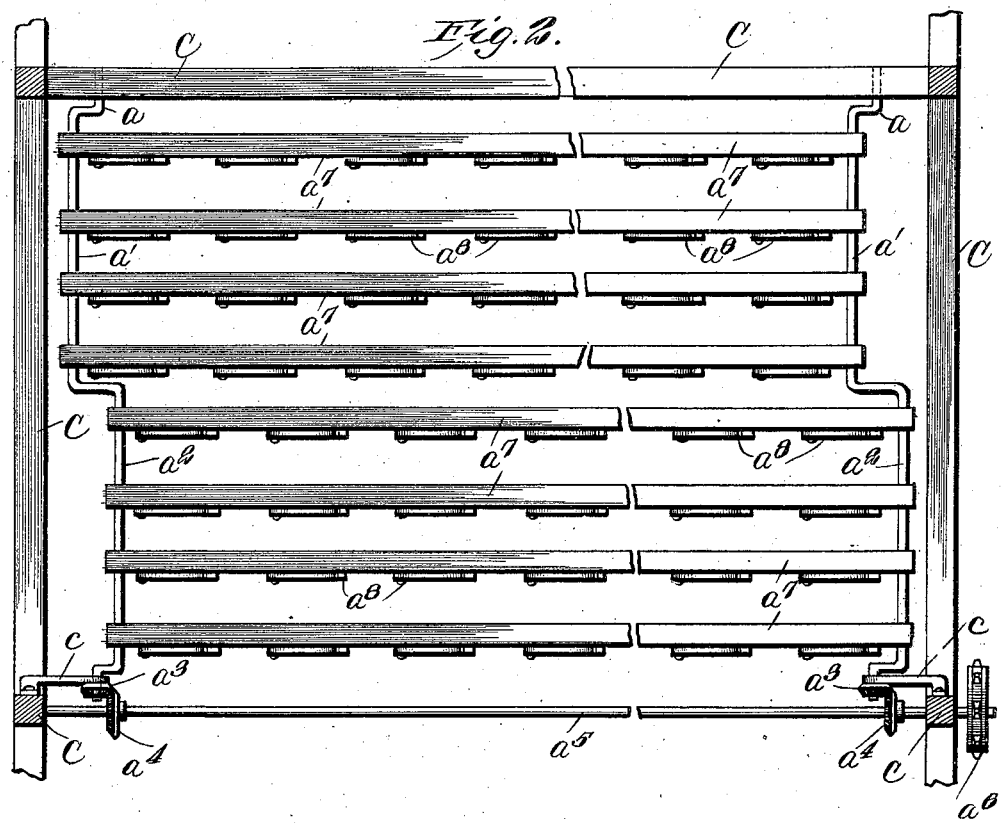
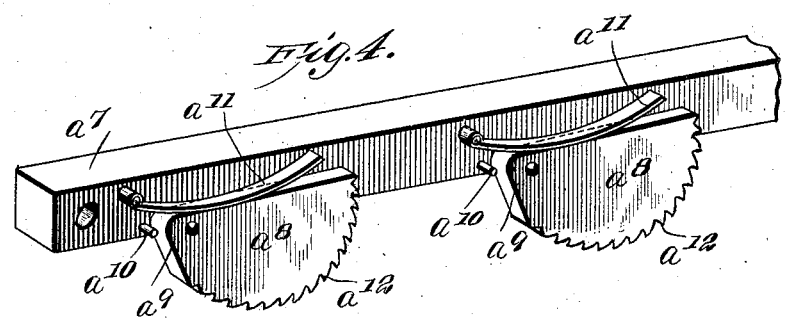
WITNESSES
INVENTOR
JOHN HETTRICH
BY
ATTORNEYS

UNITED STATES PATENT OFFICE.

JOHN HETTRICH, OF GRAND ISLAND, NEBRASKA.

CORN-HUSKING MACHINE.

No. 876,802.　　　　Specification of Letters Patent.　　　　Patented Jan. 14, 1908.

Application filed April 27, 1907. Serial No. 370,636.

*To all whom it may concern:*

Be it known that I, JOHN HETTRICH, a citizen of the United States, and resident of Grand Island, in the county of Hall and State of Nebraska, have invented an Improved Corn-Husking Machine, of which the following is a specification.

My invention is an improvement in corn husking machines, and consists in certain novel constructions and combinations of parts hereinafter described and claimed.

The invention is especially adapted for use in the corn harvester shown and described in my Patent No. 846,204, of March 5, 1907, and is adapted to be arranged above the husking rollers to assist them in removing the husk from the ears.

Referring to the drawings forming a part hereof, Figure 1 is a sectional side elevation of the husking rollers and improvement. Fig. 2 is a plan view of the improvement. Fig. 3 is a section on the line 3—3 of Fig. 1; and Fig. 4 is a detail view in perspective of a part of the improvement.

In the present embodiment of my invention, the improvement A is arranged above the husking rollers B, and is suitably supported by the framework C of the machine. As shown and described in my abovementioned patent, the husking rollers B are arranged in pairs, each pair being spaced apart from the adjacent pair, and a shield $b$ is arranged between each pair to deflect the ears of corn between the rollers, the rollers being suitably journaled in the machine and driven in any suitable manner.

The improvement comprises spaced shafts $a$ arranged at opposite sides of the machine and parallel with and above the husking rollers, the said shafts each being provided with oppositely cranked portions $a'$, $a^2$, as shown in Fig. 2. One end of each of the shafts is journaled in a part of the framework C, and the other end is journaled in a bracket $c$, secured to the framework and projecting inwardly therefrom as shown in Fig. 2. The end of each shaft adjacent to the bracket $c$ is provided with a bevel gear $a^3$ meshing with a bevel gear $a^4$ on a transverse shaft $a^5$ suitably journaled on the frame, and provided on its outer end with a sprocket wheel $a^6$, whereby the shaft may be driven. A plurality of cross bars $a^7$ are journaled on the shafts $a$, one end of each bar being journaled on one shaft and the other end on the other shaft, and the said bars are spaced apart from each other as shown in Fig. 2. In the present instance, eight bars are shown, and four of the said bars are connected with the cranked portions $a'$ of the shafts, while the other four are connected with the cranked portions $a^2$ of the shafts, so that when the said shafts are rotated, the one set or series of bars will move in the opposite direction to the other set or series. A plurality of half-moon shaped plates $a^8$ are pivotally connected by one corner with each bar by means of a pivot pin $a^9$, and are limited in their downward movement with respect to the bar by means of a pin $a^{10}$ secured in said bar as shown in Fig. 4. A plate spring $a^{11}$ is arranged above each plate, the said spring being secured to the bar and pressing upon the upper edge of the plate. On the lower edge of each of the plates are pointed projections or corrugations as shown at $a^{12}$, whereby to better engage the husks of the corn when the device is in operation.

In operation, the snapped ears of corn are delivered on the upper end of the husking rollers, and tend by gravity to slide towards the lower end thereof. During their passage toward the lower end of the rollers, they are engaged by the plates which tend to insure the proper engagement of the husk by the husking rollers, while at the same time the plates act to loosen the husk on the ears. The provision of the spring $a^{11}$ permits the plates to yield upwardly when engaging a large ear of corn, while retaining them in proper position at all times to engage the smaller ears.

By providing two series of plates, one series is always in contact with the ears of corn on the rollers, so that it is practically impossible for any of the ears to reach the lower end of the rollers without engagement by one or more plates.

While I have shown and described my improvement as applied to inclined husking rollers, it is obvious that it might with equal facility be used with rollers arranged in a horizontal plane.

It will be noticed that the plates are arranged transversely of the rollers and perpendicular thereto, and that the plates reciprocate in the direction of their length.

I claim:

1. The combination with the inclined husking rollers, of spaced shafts journaled above and longitudinally of the rollers, each of said shafts being provided with oppositely arranged cranked portions, bars connecting the corresponding cranked portions of the shafts, plates pivoted by one corner at spaced intervals to the bars, a stop for limiting the downward motion of the plates, and springs normally acting to depress the plates, said plates having their lower edges rounded and provided with pointed projections for the purpose set forth.

2. The combination with the inclined husking rollers, and the frame for supporting said rollers, of spaced shafts journaled above and longitudinally of said rollers, each of said shafts having oppositely arranged cranked portions, bars connecting the corresponding cranked portions of the shafts, said bars being journaled on said cranked portions, and a plurality of spring pressed plates pivoted to each bar, said plates depending below the bar and having their lower edges corrugated.

3. The combination with the inclined husking rollers, of a plurality of bars mounted for transverse reciprocation above the rollers, each of said bars being provided with a plurality of spring pressed plates depending therefrom, and adapted to engage the corn on the rollers, said plates having their lower edges corrugated.

4. The combination with the husking rollers, of plates arranged transversely thereof, said plates being normally spring-pressed towards the rollers and having their lower edges rounded and provided with notches for the purpose set forth, and means for moving said plates transversely of the rollers in proximity to the rollers in one direction and remote from the rollers in the other direction.

JOHN HETTRICH.

Witnesses:
W. H. THOMPSON,
LIZZIE LIMBACK.